United States Patent
Dodson

(10) Patent No.: US 7,810,722 B2
(45) Date of Patent: Oct. 12, 2010

(54) SYSTEM FOR DELIVERING WEB CONTENT TO FUEL DISPENSER

(75) Inventor: Dave Dodson, Virginia Beach, VA (US)

(73) Assignee: Dresser, Inc., Addison, TX (US)

( * ) Notice: Subject to any disclaimer, the term of this patent is extended or adjusted under 35 U.S.C. 154(b) by 483 days.

(21) Appl. No.: 11/879,432

(22) Filed: Jul. 17, 2007

(65) Prior Publication Data

US 2008/0021983 A1 Jan. 24, 2008

Related U.S. Application Data

(63) Continuation of application No. 10/162,026, filed on Jun. 4, 2002, now abandoned.

(60) Provisional application No. 60/296,097, filed on Jun. 5, 2001.

(51) Int. Cl.
G06F 7/08 (2006.01)
(52) U.S. Cl. .......................... 235/381; 235/384; 705/21
(58) Field of Classification Search ................. 235/376, 235/380, 381, 384; 705/21, 26
See application file for complete search history.

(56) References Cited

U.S. PATENT DOCUMENTS

| | | | |
|---|---|---|---|
| 4,967,366 A | 10/1990 | Kaehler | |
| 5,418,713 A | 5/1995 | Allen | |
| 5,500,890 A | 3/1996 | Rogge et al. | |
| 5,805,803 A | 9/1998 | Birrell et al. | |
| 5,859,416 A | 1/1999 | Gatto | |
| 5,953,700 A | 9/1999 | Kanevsky et al. | |
| 5,963,915 A | 10/1999 | Kirsch | |
| 6,003,014 A | 12/1999 | Lee et al. | |
| 6,018,717 A | 1/2000 | Lee et al. | |
| 6,047,268 A | 4/2000 | Bartoli et al. | |
| 6,052,629 A | 4/2000 | Leatherman et al. | |
| 6,055,573 A | 4/2000 | Gardenswartz et al. | |
| 6,068,183 A | 5/2000 | Freeman et al. | |
| 6,070,156 A | 5/2000 | Hartsell, Jr. | |
| 6,073,840 A | 6/2000 | Marion | |
| 6,078,896 A | 6/2000 | Kaehler et al. | |
| 6,078,902 A | 6/2000 | Schenkler | |
| 6,089,284 A | 7/2000 | Kaehler et al. | |
| 6,092,053 A | 7/2000 | Boesch et al. | |
| 6,092,197 A | 7/2000 | Coueignoux | |
| 6,098,879 A | 8/2000 | Terranova | |
| 6,101,482 A | 8/2000 | Diangelo et al. | |
| 6,101,486 A | 8/2000 | Roberts et al. | |
| 6,112,240 A | 8/2000 | Pogue et al. | |
| 6,116,505 A | 9/2000 | Withrow | |
| 6,128,551 A | 10/2000 | Davis et al. | |

(Continued)

*Primary Examiner*—Karl D. Frech
(74) *Attorney, Agent, or Firm*—Fish & Richardson P.C.

(57) ABSTRACT

A refueling environment is coupled to a remote facility disposed apart from fuel dispenser locations and is connected to a network. A user identification is sent to the remote facility. The remote facility establishes an access connection with a network node, on behalf of the customer. The network communications follow a client-server session format and are correlated to the user ID. The remote facility sends a cookie element to the server that was previously set by the server during an initial Web site visit. The cookie contains state information. The remote facility associates the unique identification number with the relevant user ID. The server uses the received cookie element to identify the corresponding user profile record maintained at the server side. The server generates customized content from the retrieved user profile record and sends it to the customer.

39 Claims, 6 Drawing Sheets

U.S. PATENT DOCUMENTS

| | | |
|---|---|---|
| 6,134,532 A | 10/2000 | Lazarus et al. |
| 6,134,592 A | 10/2000 | Montulli |
| 6,213,393 B1 | 4/2001 | Streicher et al. |
| 6,424,981 B1 | 7/2002 | Isaac et al. |
| 6,540,135 B1 | 4/2003 | Berstis |
| 6,619,543 B1 | 9/2003 | Smith |

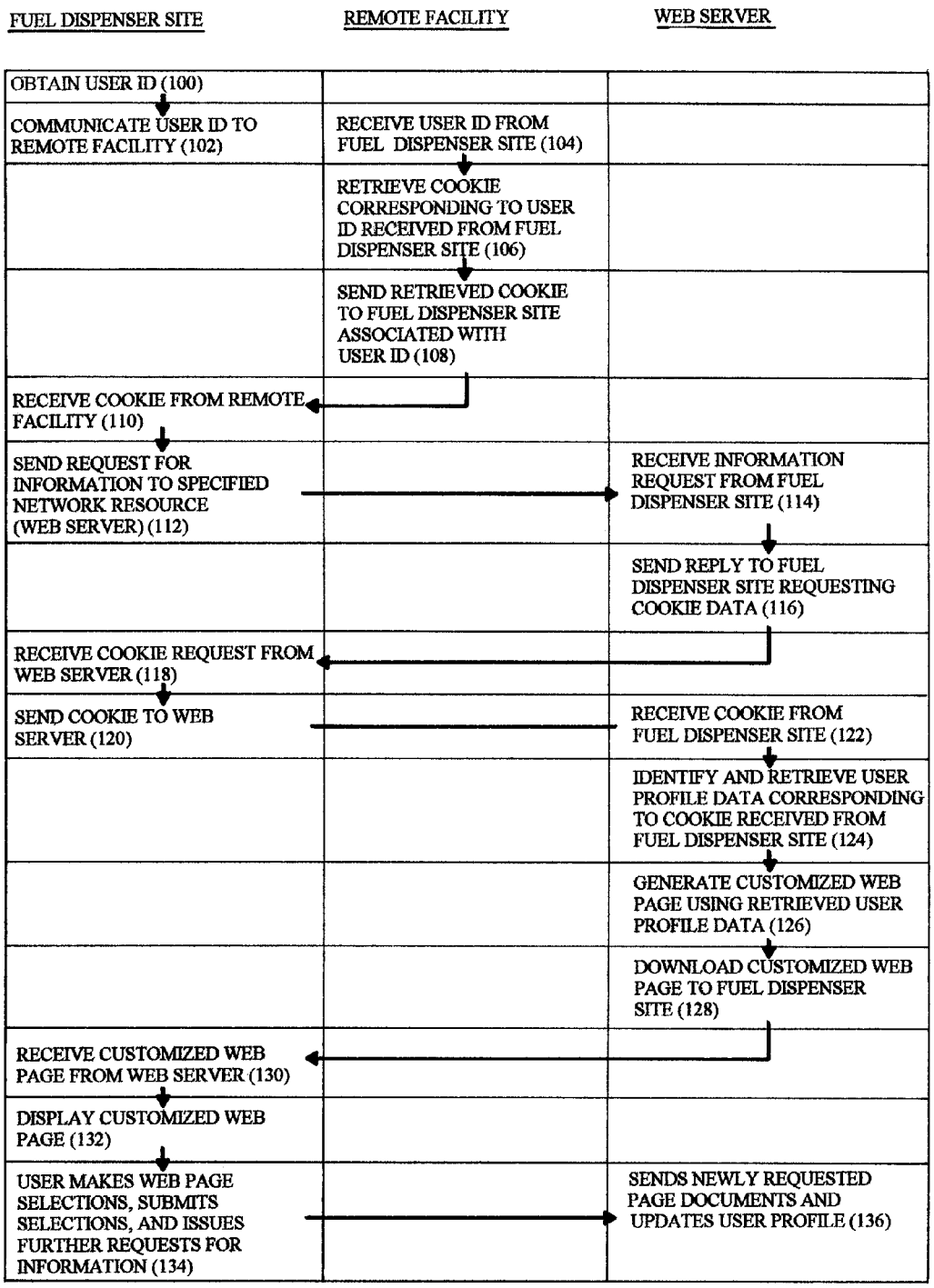
FIG_6

SYSTEM FOR DELIVERING WEB CONTENT TO FUEL DISPENSER

CROSS-REFERENCE TO RELATED APPLICATIONS

This application is a Continuation of U.S. patent application Ser. No. 10/162,026 filed Jun. 4, 2002, which is a nonprovisional application based on U.S. Provisional Application Ser. No. 60/296,097 filed Jun. 5, 2001, the disclosures of which are hereby explicitly incorporated by reference herein.

BACKGROUND OF THE INVENTION

1. Field of the Invention

The present invention relates to a system for delivering Web site content to a refueling environment, and, more particularly, to a system providing customized Web pages to fuel dispenser sites that employs a remote facility which links a user identification with a state object such as an internet cookie utility.

2. Description of the Related Art

The World Wide Web is a wide-area hypermedia information retrieval system aimed at providing unlimited access to a large universe of documents. The architecture of the Web follows a conventional client-server model. Generally, a client refers to a machine or other such computer entity that requests information, while a server refers to an entity that provides the information.

Under the Web environment, Web browsers reside in clients and Web documents reside in servers. A Web browser is a client-side software program that may be run on a computers. Well known browsers include Netscape Navigator™ and Microsoft's Internet Explorer™. Web clients and Web servers communicate using a protocol called Hypertext Transfer Protocol (HTTP). The Web is that portion of the Internet which communicates in the HTTP protocol.

According to a conventional access protocol, a browser opens a connection to a specified server and initiates a request for a document. As known, this connection is facilitated with the use of Uniform Resource Locators (URLs). In response, the accessed server delivers the requested document, typically in the from of a text document coded in a standard Hypertext Markup Language format (HTML). When the connection is closed to conclude the session (i.e., the client-server interaction), the server returns to a passive role, namely, it can accept commands from the same or other clients but does not request the client to perform any actions.

More particularly, in response to a document request sent by a browser, a server sends multiple HTML files (i.e., Web site pages) contained within a sequence of messages implemented in the HTTP protocol. When the HTML file(s) are received by the client computer executing the browser, each communication stack layer performs its function until a datastream containing an HTTP header and corresponding data segment is presented to the browser. On the Internet, the communication stack implements a Transport Control Protocol/Internet Protocol (TCP/IP).

One portion of the browser verifies that the information and the HTTP header have been accurately delivered to the application program. The browser then displays the data delivered in the HTML files received from the server. Because the TCP/IP protocol used for the Internet is a packet communication protocol, several messages are typically required before a complete file is available for display.

Although the server functions chiefly to provide the client with requested information, the server may also send state information to a client for storage on the client side, which will be subsequently retransmitted to the server during a later visit. For example, when a server responds to an HTTP request by returning an HTTP document object to a client, the server may also send state information provided in the form of a state object. A cookie data field is one known data field that may be included in the HTTP header of an HTTP response to embody such state information.

State information is typically developed during the first interaction (i.e., web site visit) between the web server and the client-side browser. For example, in response to an incoming message requesting a multimedia object, the server examines the request to determine the Internet Protocol (IP) address of the requesting browser and to determine whether a cookie was received, for example, in the MIME heading of the request.

If the browser at the client-side (i.e., sender) is cookie enabled but no cookie is detected, then the request is considered by the server to originate from a new user. Accordingly, the server assigns a unique identification number or code to the sender that the server transmits back to the client-side browser in the form of a cookie. This transmission is accompanied by a write cookie instruction that causes the client browser to write a cookie containing that unique identification number on the local drive or memory of the sender. For example, the transmitted cookie is typically stored on the hard disk of the client PC within a cookie list compiled by the client PC. The cookie can be included within later communications involving returns visits by the client to the server.

Typically, the cookie includes a description of a range of URLs for which the related state information is considered valid. As known, this URL range definition could be set by appropriately setting the domain attribute field as part of the write cookie instruction. Thus, when the client system sends future HTTP requests to servers that fall within the range of defined URLs for a particular cookie, the requests will include a transmittal of the current value of the corresponding state object associated with the cookie.

The use of cookies has gained prominence in the field of Internet advertising. For example, advertisers are able to implement a limited form of targeted advertising over the Internet by maintaining a server-side user profile database that records user-specific information pertaining to various users that may potentially access the server. Each user profile is cross-indexed to a unique identification number previously assigned to the user (i.e., client-side sender) during a first visit by the user. An example of such a system may be found in U.S. Pat. No. 5,948,061, which is incorporated herein by reference thereto.

When the client system accesses a web site having an address within a limited range of domain names specified by a written cookie stored at the client, the client system automatically transmits a copy of the relevant cookie to the web server that hosts the accessed web site. The cookie preferably includes the unique identification number that was previously assigned to the client by the server during a first visit.

At the server side, the accessed server interprets the unique identification number contained within the received cookie as an indication of the identity of the client system. The server uses the cookie to identify the corresponding user profile information stored within the profile database maintained at the server side. In this manner, a customized copy of the requested web page can be constructed and delivered to the web browser based upon the user-specific profile data retrieved from the database.

However, current usage of this cookie utility cannot accommodate implementations where a user needs to receive customized web pages at various client machines. The unique identification numbers assigned by servers are machine-specific, namely, the identification number corresponds to a unique client entity. Accordingly, in the case where a common PC terminal is shared by various individuals accessing the same server at different times, the profile data on one user developed during a dedicated communications session will be commingled with profile data on another user accessing the same server during another communications session.

This commingling of profile data occurs because the server is not capable of distinguishing or discriminating between the different users. From the viewpoint of the server, it appears that the same user (and hence the same profile definition) is accessing the server since the incoming cookie containing the unique identification number is the same regardless of who is manning the client terminal (i.e., manipulating the browser). Accordingly, although several different individuals are accessing the same server at different times, the server is manipulating and working with the same user profile record since the corresponding client identification number transmitted in the cookie is the same for each access connection.

This limitation is particularly noticeable in application environments where system customers are mobile and services can be rendered over a wide geographic region. For example, in refueling environments having a network of fuel dispenser sites, it would be desirable to provide an operational functionality that delivers customized content while supporting client portability. In this manner, a customer can receive customized content regardless of the client location (i.e., fuel dispenser site) where the customer decides to establish an access connection to a specified server.

SUMMARY OF THE INVENTION

A system is provided for use in a refueling environment comprising a plurality of fuel dispenser sites. The individual refueling locations are arranged for communication with a remote central facility. The remote facility is arranged for communication with a network having a plurality of nodes. In one form, the network is the Internet and includes the World Wide Web, with various ones of the individual nodes being configured as Web servers. In a preferred form, the refueling locations and remote facility are connected to the network and hence can be considered network nodes.

According to one form of the invention, a refueling customer provides a user identification as part of the refueling transaction. For example, during a credit or debit transaction, the customer credit card number may be retrieved from the dispenser input device (i.e., magnetic card reader) and translated into a user identification (ID) signal. The user ID is then transmitted to the remote facility.

At the remote facility, following receipt of the user ID from the corresponding fuel dispenser site, a request for information is directed to a specified network node, i.e., Web server. This information request, for example, pertains to a designated Web page and is typically referenced in a known manner using an appropriate Uniform Resource Locator (URL). The specified Web server, following receipt of the information request from the remote facility, sends a reply to the remote facility requesting state information, namely, cookie data.

At the remote facility, in response to the cookie request received from the Web server, the unique cookie data element corresponding to the user ID associated with the current communications session is retrieved from a database and forwarded to the Web server. The remote facility maintains an archive of user identification elements each cross-indexed with a respective state object, i.e., cookie data element.

Various cookie data elements each corresponding to a respective server may be associated with a particular user ID element. For this purpose, and in a known manner, the remote facility will include a functionality that enables it to identify and retrieve only that cookie element that corresponds to the specified server participating in the current session associated with the relevant user ID. For example, a simple comparison of the current server URL specification to the domain attributes of each cookie element will reveal the correct cookie element.

In a conventional manner, the state object embodied within a cookie is first created during an initial interaction between the remote facility and the Web server in connection with a corresponding user ID. In particular, the Web server generates a cookie upon receiving an indication from the remote facility that no cookie is present relating to the current user ID of interest. The generated cookie is forwarded to the remote facility, which adds it to the database and associates it with the corresponding user ID.

At the Web server, assuming that the remote facility possesses the requested cookie and has sent it to the server, the cookie data element received from the remote facility is used as an index marker for performing searches in a user profile database maintained by the Web server. The database includes a plurality of user profile data elements each cross-indexed with a unique cookie data element, namely, unique identification numbers previously assigned by the server.

The Web server retrieves from the database the relevant user profile data element that corresponds to the cookie currently received from the remote facility. In particular, the cookie is used to access and identify the correct user profile data record. The Web server generates a customized Web page based upon the user profile data retrieved from the database. The customized Web page is then forwarded to the remote facility.

At the remote facility, the customized Web page received from the Web server is downloaded to the relevant fuel dispenser site where it is displayed or otherwise presented for viewing by the customer. For this purpose, the fuel dispenser sites are preferably configured with a client functionality including, for example, a computer machine (e.g., personal computer) having an executable browser program and a graphical user interface (GUI). Optionally, the customized Web page may be downloaded directly from the Web server to the fuel dispenser site, which is possible when the refueling environment is connected to the network.

According to another form of the invention, a user identification is similarly transmitted to the remote facility from a respective fuel dispenser site. At the remote facility, following receipt of the user ID from the fuel dispenser site, the remote facility retrieves the cookie data element corresponding to the user ID and forwards the retrieved cookie to the fuel dispenser site. The remote facility similarly maintains an archive of user identifications each cross-indexed with a respective state object, i.e., cookie data element.

At the fuel dispenser site, following receipt of the cookie data element from the remote facility, a request for information is directed to a specified network node, i.e., Web server. The Web server, following receipt of the information request from the fuel dispenser site, sends a reply to the fuel dispenser site requesting state information, namely, cookie data. At the fuel dispenser site, in response to the cookie request from the Web server, the cookie data element received from the remote facility is forwarded to the Web server.

At the Web server, the cookie data element received from the fuel dispenser site is used as an index marker for performing searches in the user profile database maintained by the Web server. The database likewise includes a plurality of user profile data elements each cross-indexed with a unique cookie data element. The Web server likewise retrieves from the database the relevant user profile data element that corresponds to the cookie currently received from the fuel dispenser site, using the cookie to access and identify the correct user profile data record. The Web server generates a customized Web page based upon the user profile data retrieved from the database. The customized Web page is then forwarded to the fuel dispenser site.

At the fuel dispenser site, the customized Web page received from the Web server is displayed or otherwise presented for viewing by the customer. For this purpose, the fuel dispenser sites are preferably configured with a client functionality including, for example, a computer machine (e.g., personal computer) having an executable browser program and a graphical user interface (GUI).

The invention, in one form thereof, is directed to a system for use with a network comprising at least one resource. The system includes a refueling environment capable of servicing at least one user, and a remote facility disposed apart from the refueling environment. The remote facility is configured to execute operational functions comprising, inter alia, receiving a user identification from the refueling environment, providing state information associated with the user identification, and sending the state information associated with the user identification from the remote facility to a selective one of the at least one resource in the network.

In one form, the selective one network resource is configured to execute operational functions comprising, inter alia, directing customized resource content from the selective one network resource to the refueling environment, wherein the customized resource content is developed by the network resource using the state information received from the remote facility.

For this purpose, the network resource preferably comprises a means for developing the customized resource content. The content development means is configured to operatively perform the following operations: retrieving user profile data corresponding to the user identification, the retrieval operation using the state information received from the remote facility to identify the user profile data, the user profile data being maintained by the selective one network resource, and generating content using the retrieved user profile data.

In a preferred form, the network resource includes, in combination, a data structure comprising a plurality of user data records each indexed with a respective state information element; a means for retrieving a user data record from the data structure, using state information operatively received from the remote facility as an identifier; a means for generating content, using the retrieved user data record; and a means for communicating the generated content from the respective network resource to the refueling environment.

The delivery of customized resource content from the selective one network resource to the refueling environment preferably occurs via the remote facility.

The remote facility, in one form, is configured further to selectively send a resource request from the remote facility to the selective one network resource. At least one network resource is configured to execute operational functions comprising, inter alia, prompting the remote facility for state information, in response to a resource request received from the remote facility, the resource request being associated with a respective user identification; and generating and sending state information to the remote facility, in response to an indication received from the remote facility responsive to the state information prompt that no state information exists relative to the respective user identification associated therewith.

The state information preferably includes a cookie. Additionally, the user identification comprises at least one of credit card information, biometric data, bar code data, phone number data, and name data.

The invention, in another form thereof, is directed to a system for use with a network comprising at least one resource. The system comprises, in combination, a refueling environment capable of servicing at least one user, and a remote facility disposed apart from the refueling environment.

The remote facility is configured to execute operational functions comprising, inter alia, receiving at least one user identification from the refueling environment, sending at least one respective request for information from the remote facility to the network, each information request being associated with a respective user identification and being directed to a respective selective network resource, and sending at least one state object communication from the remote facility to the network.

Each state object communication is associated with a respective user identification and is directed to the respective selective network resource associated therewith. Furthermore, each state object communications is responsive to a respective state information request issued by the respective selective network resource associated therewith. Moreover, each state object communication includes respective state information associated with the respective user identification associated therewith.

In one form, each network resource is configured to execute operational functions comprising, inter alia, generating content according to a user profile maintained by the respective selective network resource, the user profile being identified by the respective state information communicated from the remote facility, and directing the generated content from the respective selective network resource to the refueling environment.

In another form, each network resource is configured also to operatively execute the following operations: generating state information, responsive to an indication received from the remote facility that no state information is present relative to a respective user identification, and sending the generated state information to the remote facility. The remote facility, in another form, is configured to execute operational functions comprising, inter alia, associating the state information received from the respective network resource with the respective user identification.

The state information preferably includes a cookie. Additionally, the user identification comprises at least one of credit card information, biometric data, bar code data, phone number data, and name data.

The invention, in another form thereof, is directed to a system for use with a network comprising at least one node. The system comprises, in combination, a refueling environment comprising a plurality of fuel dispenser sites, the refueling environment being capable of servicing at least one user; and a central facility disposed apart from at least one fuel dispenser site.

The refueling environment is configured to selectively operatively communicate at least one user identification from the refueling environment to the central facility. Each communicated user identification is associated with a respective user of a respective fuel dispenser site.

The central facility comprises, in combination, a means to provide at least one respective state object in association with each respective user identification, and a means, responsive to at least one respective user identification, for directing a respective communication from the central facility to a respective node in the network, the respective communication including at least one respective state object associated with the respective user identification.

In one form, each network node further comprises, in combination, a means for generating customized content, the content being developed using a respective state object communication received by the respective one network node from the central facility; and a means for directing the generated content to a respective fuel dispenser site corresponding to the respective user having the respective user identification associated with the respective state object communication.

The content generation means, in one form, includes a means for retrieving user profile data corresponding to the respective user identification associated with the state object communication received by the one network node from the central facility, and a means for providing content using the retrieved user profile data. The retrieval operation uses the respective state object communication received from the central facility to identify the respective user profile data.

The central facility, in one form, comprises in combination a means for generating and sending at least one request for information from the central facility to the network, each information request being associated with a respective user identification and being directed to a respective network node; and a means for generating and sending at least one reply communication from the central facility to the network. Each such reply communication is responsive to a respective state object request sent thereto by a respective network node and is directed to the respective network node. Moreover, each such reply communication includes at least one state object associated with the respective user identification.

The central facility, in another form, also includes a means for directing at least one communication from the central facility to a respective fuel dispenser site. Each such communication is associated with a respective user identification of a corresponding user of the fuel dispenser site. Preferably, at least one such central facility communication includes at least one state object associated with the respective user identification. The refueling environment, in another form, further includes a means for directing at least one respective communication from a respective corresponding fuel dispenser site to a respective node in the network. At least one of the fuel dispenser site communications includes at least one state object communicated thereto from the central facility.

Each network node, in another form, further includes in combination a means for generating a respective state object, the respective state object being associated with a respective communication from the central facility involving a respective user identification, and a means for sending the generated state object to the central facility. The central facility, in another form, further includes a means for associating respective state information received from a respective network node with the respective user identification associated therewith.

Each network node, in yet another form, also includes in combination a data structure comprising a plurality of user data records each correspondingly associated with a respective state information element; a means, responsive to a respective state object received by the respective one network node from the central facility, for retrieving from the data structure a user data record corresponding to the respective state object; a means for generating content, using the retrieved user data record; and a means for directing the generated content to at least one of the central facility and the refueling environment.

At least one state object preferable includes at least one respective cookie. Additionally, each user identification respectively comprises at least one of credit card information, biometric data, bar code data, phone number data, and name data.

The invention, in another form thereof, is directed to a system for use with a network comprising at least one resource. The system includes, in combination, a refueling environment capable of servicing at least one user, and a remote facility disposed apart from the refueling environment.

The remote facility is configured to execute operational functions comprising, inter alia, receiving a user identification from the refueling environment, providing state information associated with the user identification, and sending the state information associated with the user identification from the remote facility to the refueling environment.

The refueling environment is configured to execute operational functions comprising, inter alia, sending state information received from the remote facility to a selective one of the at least one resource in the network.

In one form, at least one network resource further includes a means for providing customized resource content to the refueling environment. The customized resource content is developed by the respective one network resource using state information received from the refueling environment.

More particularly, in a preferred form, the network resource further includes, in combination, a data structure comprising a plurality of user data records each indexed with a respective state information element; a means, responsive to state information received from the refueling environment, for retrieving a user data record from the data structure corresponding to the received state information; a means for generating content, using the retrieved user data record; and a means for directing the generated content to the refueling environment.

The state information preferably includes a cookie. Additionally, the user identification comprises at least one of credit card information, biometric data, bar code data, phone number data, and name data.

The invention, in yet another form thereof, is directed to a system for use with a network comprising at least one node. The system includes, in combination, a refueling environment comprising at least one fuel dispenser site, the refueling environment being capable of servicing at least one user; and a remote facility disposed apart from at least one fuel dispenser site.

The refueling environment is configured to execute operational functions comprising, inter alia, directing at least one user identification from the refueling environment to the remote facility. Each user identification is associated with a respective user of a respective fuel dispenser site.

The remote facility comprises, in combination, a means for providing respective state information in association with at least one respective user identification received from the refueling environment; and a means, responsive to a respective user identification received from the refueling environment, for sending a respective communication to the respective fuel dispenser site associated with the respective user identification. The remote facility communication includes respective state information associated with the respective user identification.

At least one fuel dispenser site, in one form thereof, further includes a means, responsive to a respective state information communication received from the remote facility, for sending a respective user communication to a selective one of the at least one network node. The respective user communication includes the respective state information.

At least one network node, in one form thereof, further includes in combination a means, responsive to respective state information operatively received from a respective fuel dispenser site, for generating content according to a user profile is maintained by the network node; and a means for directing the generated content to the respective fuel dispenser site. The user profile is identified by the received respective state information.

The state information preferably includes a cookie. Moreover, at least one user identification respectively comprises at least one of credit card information, biometric data, bar code data, phone number data, and name data.

The invention, in yet another form thereof, is directed to a system for use with a network comprising at least one node. The system includes, in combination, a refueling environment comprising at least one fuel dispenser site, the refueling environment being capable of servicing at least one user; and a central facility disposed apart from at least one fuel dispenser site.

The refueling environment includes a means for communicating at least one user identification from the refueling environment to the central facility. Each such communicated user identification is associated with a respective user of a respective fuel dispenser site.

The central facility includes, in combination, a means for associating at least one respective user identification received from the refueling environment with at least one respective state object, and a means, responsive to receiving a respective user identification communicated from a respective fuel dispenser site associated therewith, for directing a communication from the central facility to the respective fuel dispenser site. The central facility communication includes at least one state object associated with the respective user identification.

At least one fuel dispenser site, in one form thereof, further includes a means, responsive to receiving a respective state object communication from the central facility, for generating and sending a respective communication to a respective node in the network. The dispenser site communication includes at least one state object received from the central facility.

At least one network node, in one form thereof, further includes in combination a means, responsive to receiving a respective state object communication from a respective fuel dispenser site, for generating respective customized content; and a means for communicating the generated content to the respective fuel dispenser site. The content is developed using the respective state object communication received by the respective one network node. More particularly, the network node preferably includes, in combination, a data means for providing a plurality of user profile data elements each associated with a respective state element; a means, responsive to receiving a respective state object communication from a respective fuel dispenser site, for retrieving from the data means the respective user profile data element corresponding to the respective state object contained within the respective state object communication; a means for generating content using the retrieved user profile data element; and a means for communicating the generated content to the respective fuel dispenser site.

At least one state object preferably includes at least one respective cookie. Moreover, at least one user identification respectively comprises at least one of credit card information, biometric data, bar code data, phone number data, and name data.

One advantage of the present invention is that a refueling customer is able to receive customized Web page content from any fuel dispenser location, without regard to the conventional limitation that customized content typically could only be directed to the same user, i.e., client machine.

Another advantage of the present invention is that it uses a standard Internet mechanism, namely, a cookie utility, and therefore does not require any reprogramming, reconfiguration, or special communication code at the server side.

A further advantage of the invention is that the functionality of the remote facility in centrally maintaining a compilation of refueling customer identification elements each associated with at least one respective state object enables the remote facility to effectively serve as a centralized proxy-type client entity capable of fulfilling and executing the client-side operations of various actual client locations disposed apart therefrom (i.e., fuel dispenser sites).

Another advantage of the invention is that the functionality of the remote facility in centrally maintaining a compilation of refueling customer identification elements each associated with at least one respective state object enables the designation of any user machine as a client location recognizable by the network server as a distinct return visitor, since the state object corresponding to the relevant user ID is simply forwarded to the designated client location and used in communications with the specified Web server; accordingly, the Web server itself has no indication that the user is operating from a machine different from prior visits since the user has been correctly identified using the same state object, i.e., cookie data element.

Another advantage of the invention is that a unique customer profile can be established and updated during a plurality of Web site visits that are initiated and conducted by a refueling customer from multiple fuel dispenser locations; notably, the server recognizes that the same customer is associated with a particular profile since the same cookie data element is associated with the visit, although the customer may be visiting from a dispenser location and client machine different from previous visits.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 6 is a flow diagram illustrating the communications protocol implemented in the system of FIG. 5.

DETAILED DESCRIPTION OF THE INVENTION

Figure 1:
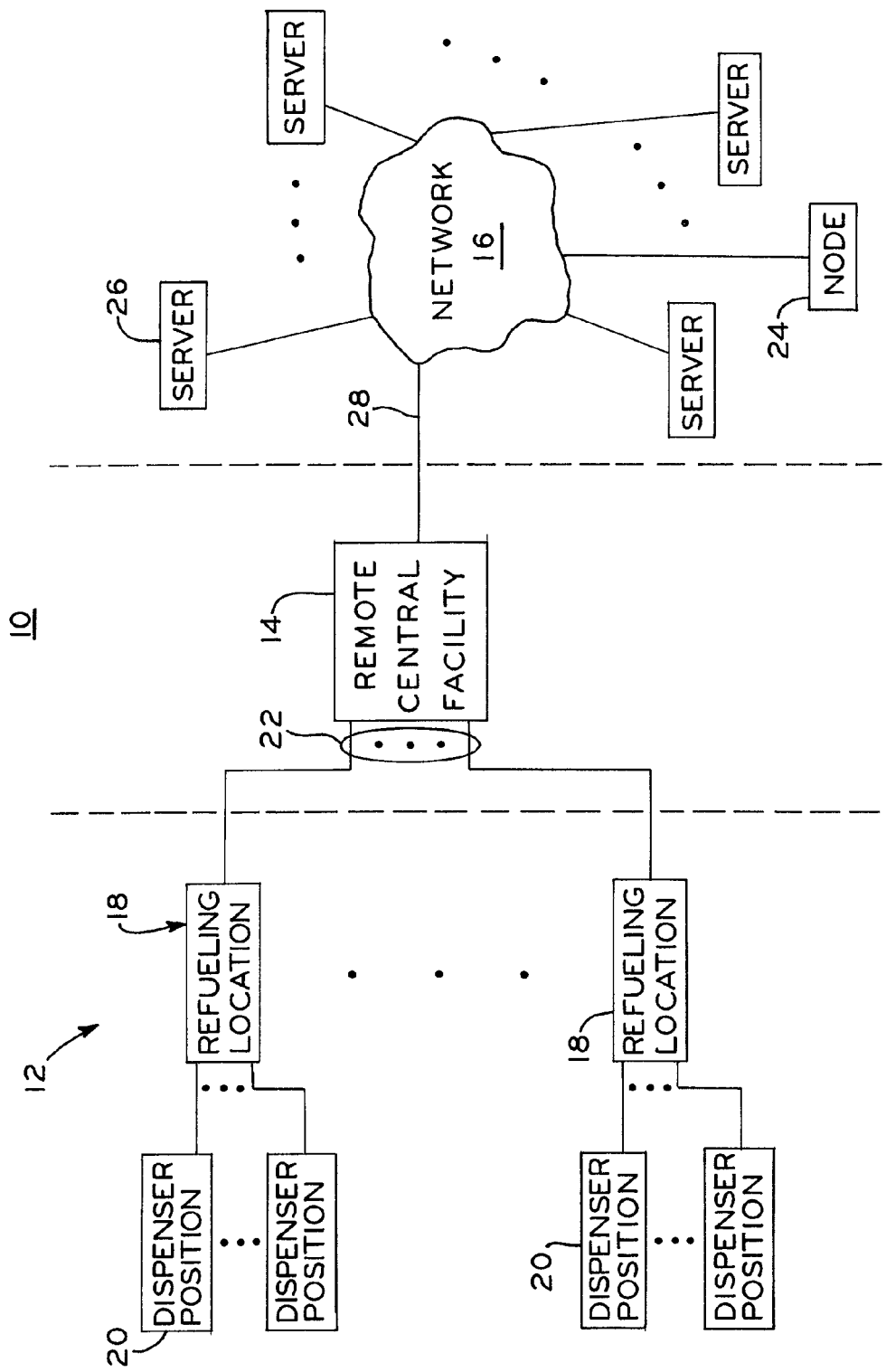
FIG. 1 is a block diagram illustration of a system configuration according to the present invention, which depicts in one form the interconnection between the refueling environment, remote facility, and network.

Referring to FIG. 1, there is shown in block diagram view an illustrative communications system 10 comprising a refueling environment 12, a remote central service facility 14, and a network 16, according to one form of the invention.

The illustrated refueling environment 12 includes a plurality of refueling locations or fuel dispenser sites 18 each including multiple dispenser positions 20 of conventional form. A representative dispenser position 20 would be capable of servicing a refueling customer in a known manner.

The illustrated remote central facility 14 is disposed apart from at least one of the fuel dispenser sites 18, but preferably from the entire refueling environment 12. As used herein, the remoteness of central facility 14 from refueling environment 12 can refer to any separation distance, covering a few miles to thousands of miles, for example. The refueling environment 12 and remote facility 14 are configured for selective connection to one another over a communications link 22 of any suitable form.

For example, communications link 22 may include a private intranet enabling peer-to-peer transmissions among the various fuel dispenser sites 18 and with remote facility 14. Alternately, each fuel dispenser site 18 may have a dedicated point-to-point link with remote facility 14. Optionally, communications link 22 may subsist (in whole or in part) within network 16.

The illustrated network 16 comprises a plurality of network nodes 24 each illustratively configured as a host resource or server 26. In a preferred form, network 16 comprises the Internet and includes the World Wide Web (WWW), where various network nodes 24 constitute Web servers 26. Remote facility 14 is arranged for connection to network 16 using any suitable connection means 28. In one form, remote facility 14 itself could be considered a node of network 16. It should be apparent that network 16 may include, and/or be connected to, various other public and/or private networks, communication systems, terminals, machines, and other such resources.

As described further herein, remote facility 14 provides a distributed, centralized management functionality that facilitates the exchange of information and the implementation of various other communication activities between the refueling environment 12 and network 16. In brief, remote facility 14 enables customers at individual fuel dispenser sites 18 to selectively access and download requested Web pages from specified Web servers 26 in network 16. This requested content is preferably customized to the individual customer. According to one aspect of the invention, this customization feature is available regardless of which fuel dispenser site 18 (and dispenser position 20) the customer is using as the client-side entity. Remote facility 14 includes a multi-tasking functionality that enables it to process, coordinate, and handle such communication tasks.

In one form, communication system 10 may be configured according to a standard client-server architecture model well known to those skilled in the art. According to such a model, remote facility 14 and the individual fuel dispenser sites 18 would be recognized and/or configured (at least in part) as client-side entities arranged for selective communication with nodes 24 of network 16, namely, Web servers 26. However, this client-server characterization should not be considered in limitation of the present invention, as it should be apparent that any suitable implementation may be used to practice the invention.

Figure 2:
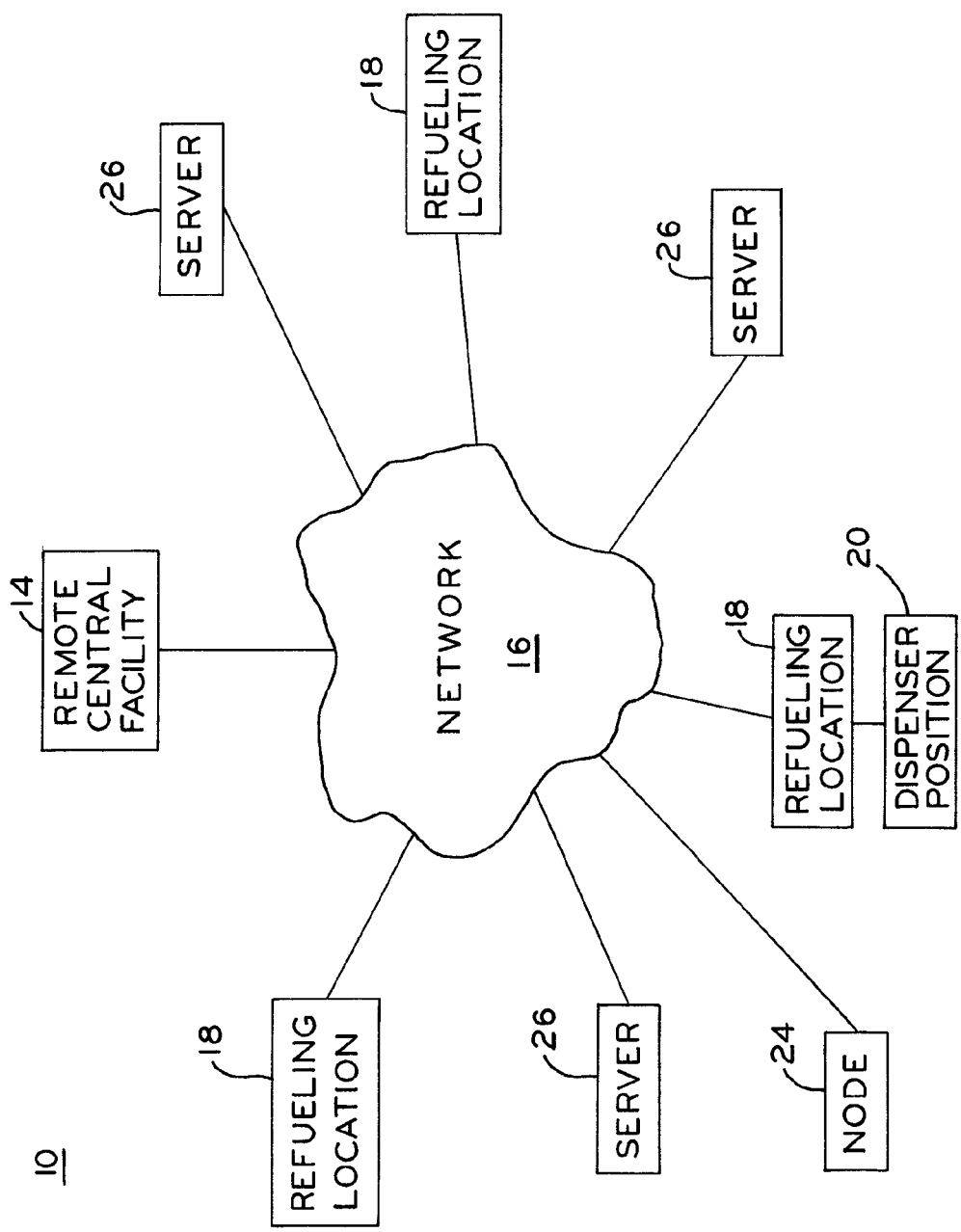
FIG. 2 is a block diagram illustration of a system configuration according to the present invention, which depicts in another form the interconnection between the refueling environment, remote facility, and network.

Referring now to FIG. 2, there is shown an alternate configuration for communication system 10 of FIG. 1, according to another form of the invention. As shown, remote facility 14 and the various fuel dispenser sites 18 are essentially configured as network nodes having a networked connection to network 16. In this manner, there is the possibility of peer-to-peer (point-to-point) communications between any ones of the nodes over network 16. For example, each dispenser position 20 can establish an access connection directly with a specified Web server 26.

The communications topology in FIG. 2 has certain advantages, particularly when network 16 represents the Internet. For example, additional nodes (e.g., fuel dispenser sites 18) can easily be added to network 16 by providing any suitable network connection. In one form, a new fuel dispenser site could be internet-enabled by simply providing a terminal running any conventional browser program suitable to navigate the Web and execute various Internet functions and commands known to those skilled in the art, e.g., tasks such as requesting, sending, receiving, selecting, and displaying Web content.

It should be understood that the network configurations shown in FIGS. 1 and 2 are simply illustrative and should not be considered in limitation of the present invention, as it should be apparent that any other suitable configuration may be used to interconnect the refueling environment 12, remote facility 14, and network 16.

Figure 3:
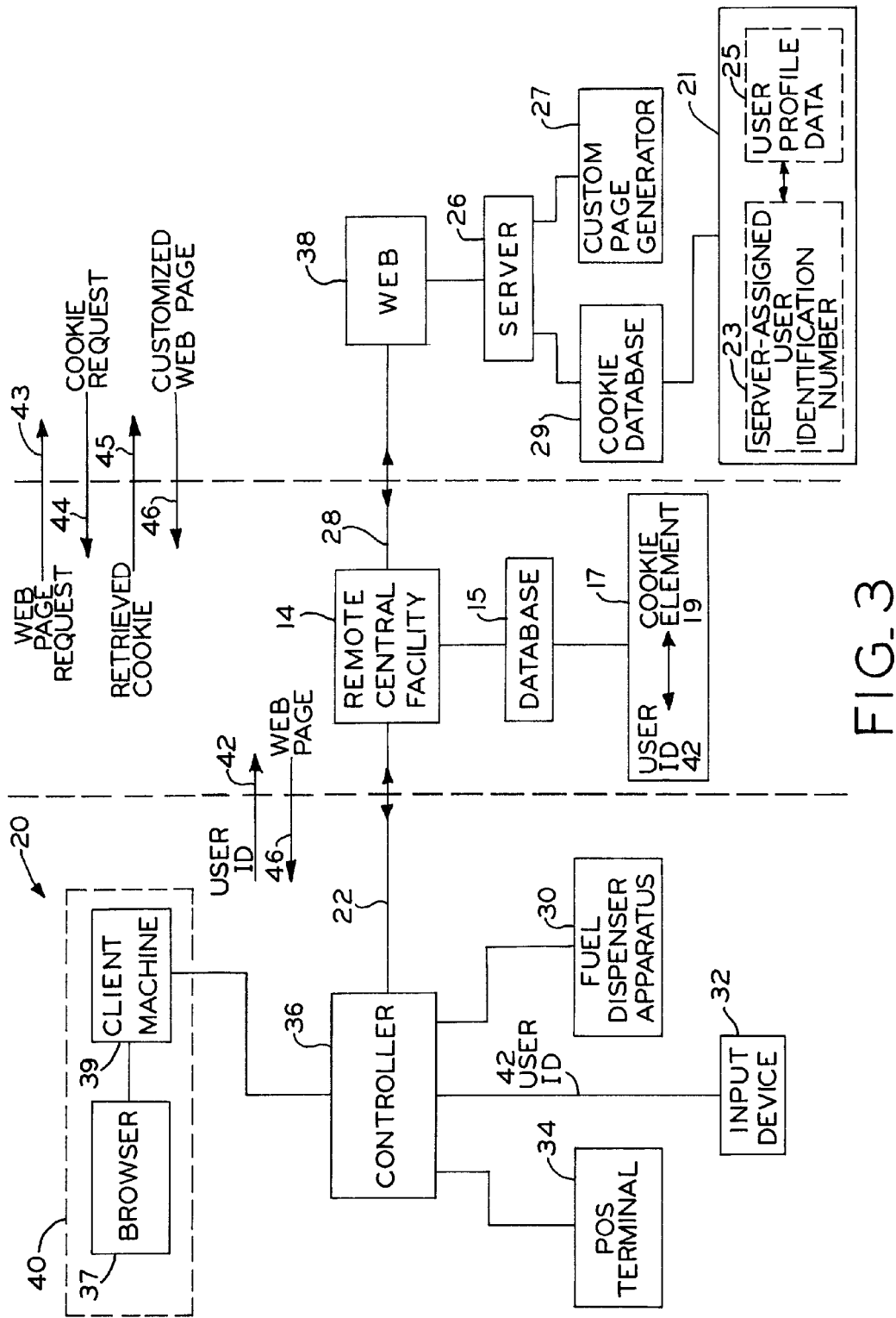
FIG. 3 is a block diagram illustration of a communications system, according to one embodiment of the present invention.

Referring now to FIG. 3, there is shown an illustrative implementation of communication system 10 of either or both FIGS. 1 and 2, according to one embodiment of the present invention. The communications protocol and/or transaction sequence involving the system of FIG. 3 is outlined in FIG. 4. Although FIG. 3 only shows an arrangement involving a single fuel dispenser position and a specified Web server, it should be understood that this illustration is merely representative and that other fuel dispenser positions may be similarly arranged with other network nodes.

The illustrated fuel dispenser position 20 is preferably provided in a conventional form including a fuel dispenser apparatus 30, input device 32, point-of-sale (POS) terminal 34, and controller 36 arranged in a conventional manner. As known, dispenser apparatus 30 may include any suitable equipment configuration for refueling a vehicle, such as a standard nozzle and hose assembly in combination with a pump assembly.

Input device 32 may include any standard mechanism for obtaining information from the customer, such as data useful in initiating, authorizing, and/or executing a refueling transaction. For example, input device 32 may include, without limitation, a magnetic card reader, optical scanner, bar code reader, keyboard, touch-sensitive display panel, or any combination thereof to collect credit card account data, debit account data, or other personal identification information from the customer.

Optionally, input device 32 may be provided in a form that collects customer information that is unaffiliated with and/or unrelated to the refueling transaction, such as biometric data or other user identification data (e.g., cell phone number, customer-specific code, or password).

In general, input device 32 may be considered any means for obtaining user identification (ID) information from the customer. Preferably, in order to standardize the setup for fuel dispenser position 20, the user ID information will embody information affiliated with the refueling transaction. In particular, in a preferred form, the user ID information will be derived and/or based upon customer payment data, e.g., credit card account information. One preferred feature of the user ID information is that it will uniquely represent the customer, as is typically the case with credit card account numbers.

The POS terminal 34 represents any conventional means that provides various transaction-related tasks, such as authorizing the requested transaction using the collected customer payment data and monitoring the refueling operation. The POS terminal 34 may be either a dedicated unit assigned to the dispenser position 20 or, more typically, a centralized control terminal housed in an on-site operator location and connected to all of the site dispenser positions.

Controller 36 implements in a conventional manner the control functionality of the various fuel dispenser positions 20. Preferably, as understood by those skilled in the art, a single site controller 36 is employed to provide centralized and distributed control of the refueling activity undertaken by the collection of fuel dispenser positions at the site.

Controller 36 is preferably provided with any suitable network connection (not shown) enabling any one of the dispenser positions 20 at the particular fuel dispenser site to establish a network connection with any other entity connected to the network. For example, in FIG. 3, the network connection would enable communications with remote facility 14. Optionally, the network connection could establish connectivity with the World Wide Web 38 (i.e., network 16).

The illustrated fuel dispenser position 20 also includes a client terminal or location 40 preferably arranged for connection to controller 36. Client terminal 40 comprises a selectively executable browser software program 42 running on a client machine 39. The client machine 39 may be provided in any conventional computer configuration. For example, client machine 39 may include, but is not limited to, a microprocessor, memory units (RAM, ROM), storage devices, controller, communications bus, peripheral devices (e.g., printer), monitor/display unit, keyboard, network devices (e.g., modem), and graphical user interface (GUI). Additionally, any of various conventional software programs may be installed on client machine 39, such as e-mail programs, word processors, and other suitable software modules.

Among its various functionalities, client terminal 40 can communicate with remote facility 14 via controller 36 and communications link 22. Alternately, client terminal 40 can be suitably configured for a direct network connection to remote facility 14 and/or Web 38. In a fully networked Internet implementation based upon the architecture of FIG. 2, client terminal 40 is configured in a conventional manner to be internet-enabled, allowing it to communicate with remote facility 14 and Web servers 26 using standard Internet communication protocols. Using technology well known to those skilled in the art, the various dispenser positions at a particular site can communicate with one another on a peer-to-peer basis using a local network or communications bus.

The illustrated remote facility 14 is provided in one form as a computing environment having a transmit/receive capability relative to the refueling environment (e.g., dispenser position 20) and network 16 (e.g., Web 38). In this form, remote facility 14 includes a computing machine, microcomputer, or other such processor apparatus containing suitable software processes and programs to implement the present invention, namely, the communications and information exchange protocol discussed in relation to FIG. 4. In one particular configuration discussed further, remote facility 14 is suitably configured as a client-side entity. Further detail on remote facility 14 is provided below in conjunction with a discussion of the communications protocol outlined in FIG. 4.

Figure 4:
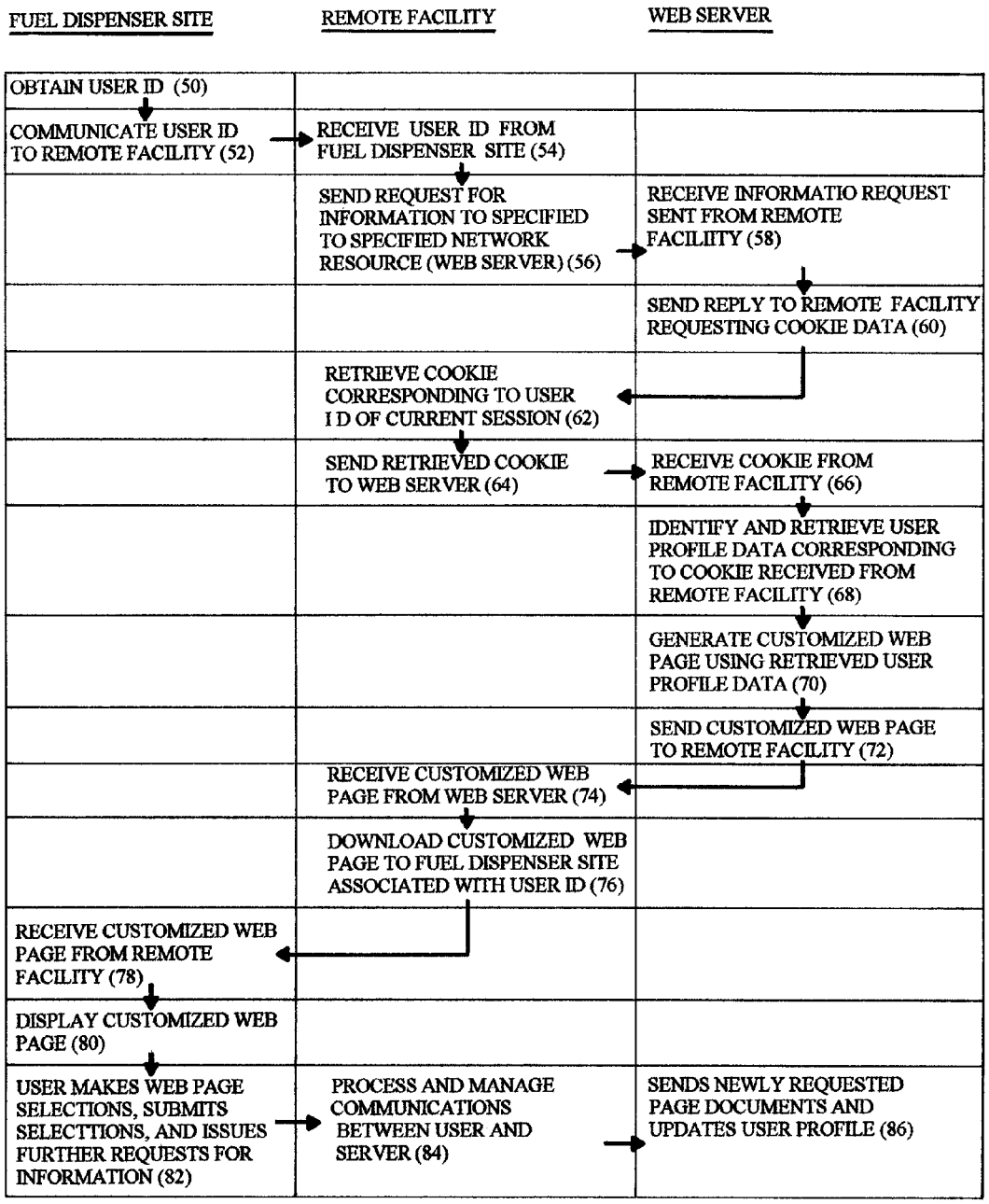
FIG. 4 is a flow diagram illustrating the communications protocol implemented in the system of FIG. 3.

During operation, with specific reference to FIG. 4, the communications system of FIG. 3 implements a communications and information exchange protocol according to the representative flow diagram of FIG. 4. Initially, a customer interested in requesting a refueling transaction at dispenser position 20 submits credit card account information via input device 32, which is provided in the form of an electromagnetic card reader (step 50). Input device 32 transmits the retrieved credit card account information to controller 36 in the form of a user identification (ID) signal 42.

Next, the user ID 42 is transmitted from the refueling environment (namely, dispenser position 20) to remote facility 14 (step 52). For this purpose, the dispenser position 20 (specifically controller 36) is preferably adapted to include a transmit/receive apparatus to facilitate such transmission. The remote facility 14 receives the user ID 42 transmitted from the refueling environment, along with an indication of the fuel dispenser site and dispenser position combination that originated the user ID transmission (step 54). This indication may be provided using any suitable addressing scheme, for example.

In response to receiving the user ID 42, the remote facility 14 initiates a communications session with a selective server 26 within the World Wide Web 38. In particular, remote facility 14 performs a client-type functionality by generating a request for information and sending this request to a specified network resource, i.e., Web server 26 (step 56). The client-server communication takes the form of a Web page request 43 that is formatted and configured according to conventional techniques.

As discussed further, Web server 26 may be any network resource, but preferably falls within the class of servers capable of delivering customized and targeted information (such as advertising) to a refueling customer at dispenser position 20. These types of servers maintain an archive of updatable customer profile records that record the online experience of the user, namely, the history of choices, preferences, and selections made by a user during the multiple visits to the Web site hosted by the server. In this manner, instead of downloading a Web page having generic non-specific content, a requested Web page can be tailored to the preferences of the requester (i.e., user). The profile is modified on an ongoing basis during the Web site visit as the user continues to make selections during an active online session.

The Web server 26 receives the Web page request 43 communicated from remote facility 14 (step 58). In a conventional manner, and in response to the information request, server 26 sends a reply communication to the content requester (i.e., remote facility 14) that includes a request for state information (step 60). In a preferred form, this state information request 44 takes the form of an interrogatory that prompts or requests the client-side sender for a cookie data element.

According to one aspect of the present invention, remote facility 14 is provided with any suitable data structure or other such means that maintains a plurality of user identification elements each cross-referenced, indexed, or otherwise associated with a respective state object, i.e., cookie data element. For this purpose, remote facility 14 preferably includes a database 15 to store such information. Each user ID corresponds to a respective customer of the refueling environment (i.e., a past, present, potential and/or prospective user).

One illustrative record or entry 17 in database 15 shows a representative user ID element 42 associated with a respective corresponding (i.e., unique) state object, namely, cookie element 19. However, it should be understood that each user ID in database 15 may be associated with a plurality of individual cookie elements each relating to a specific server. Namely, each cookie element associated with a particular user ID will be representative of a unique identification number assigned by a particular corresponding server during an initial Web site visit made by a requester client (i.e., remote facility 14).

More specifically, according to the embodiment of FIGS. 3 and 4, such an initial Web site visit producing the unique identification number will be initiated by remote facility 14 on behalf of a certain dispenser site client location 40 in connection with a particular user ID. This server assignment of the unique identification number follows a protocol and uses techniques well known to those skilled in the art.

Before proceeding with the next step in the protocol, it is useful to discuss the manner in which such cookie elements 19 are generated and stored in database 15 at remote facility 14. In a known manner, when a server directs a requester client to furnish cookie data, the client searches the cookie list maintained at the client to determine if any cookie(s) exist having the specified server within the domain definition. If any cookie elements match, the matching cookie element(s) are forwarded to the server. However, if no cookie elements match, an indication of this condition is communicated to the server.

The server interprets the absence of any cookie in the return reply of the client as an indication that the current communication session between the replying client and the server represents the first ever visit by the client to the server. In response, the server generates a unique identification number that the server assigns to the client (e.g., browser). Following this assignment, the server transmits the ID number to the client as a cookie. The cookie constitutes state information that is stored on the client-side in a cookie list.

At the server side, the generated cookie is stored in a database. In applications involving the accumulation of user profile data reflecting the selections and other online activity occurring during a Web site visit, the server database provides a means to correlate this profile data with the client identification number. This correlation allows the user profile data to be retrieved and utilized to construct a customized Web page during subsequent visits by the client. The client identification number serves as a marker or search index key into the server database.

At this point, once the assignment of the unique identification number has taken place and the client-side entity has in effect been registered by the server as a web site visitor, the communication between the client and server resumes and proceeds ahead according to its original purpose, e.g., the downloading of a requested Web page. This procedure for cookie generation and storage of the cookie at the client-side and server-side is well known to those skilled in the art, particularly as it applies to the client-server model of the Internet.

Referring again to FIG. 3, it is envisioned that this cookie generation mechanism is incorporated into the present invention in the following illustrative manner, although other procedures are possible.

Following step 60, when the remote facility 14 receives the cookie request 44 from Web server 26, the remote facility 14 executes a search of database 15 to identify and retrieve any matching cookie element(s) that are associated with the current user ID 42 of interest. The user ID 42 is used as a pointer or search mechanism within database 15 to identify the relevant collection of cookie elements that will be examined pursuant to the cookie matching operation. Upon determining that database 15 does not contain any cookie element for user ID 42 that produces a match vis-á-vis server 26, remote facility 14 directs a communication to server 26 that reflects the outcome of the cookie search responsive to the server cookie request 44.

Server 26 receives this reply communication from remote facility 14 and, upon recognizing that no cookie was found, generates a unique identification number for assignment to the requesting client, namely, remote facility 14. Server 26 transmits this identification number to remote facility 14 in the form of a cookie.

At the server-side, the assigned identification number is stored in a cookie database 29 having a plurality of representative records or entries 21 each including a respective one of the assigned identification numbers 23 linked or otherwise associated with corresponding user profile data 25. As discussed further, the user profile data is a representation of the online activity that has occurred during the various Web site visits made by a user identified by the corresponding identification number.

At the remote facility 14, a functionality is provided to recognize an incoming cookie (namely, one having the server-assigned identification number) and to invoke an associative operation that links (i.e., associates) the received cookie with the current user ID 42 to which the instant client-server session pertains. Remote facility 14 is provided with any well known functionality that enables it to keep track of the respective user ID that pertains to the communications session during which a cookie is assigned by a representative server 26 and sent to remote facility 14. In this manner, remote facility 14 can readily associate the incoming cookie with the correct user ID within database 15.

Generally, the remote facility 14 is provided with any suitable means enabling it to correlate all of the network communications between it and a specified server with the respective corresponding user ID. For example, when remote facility 14 communicates with a network server according to a typical client-server network session or transaction sequence, remote facility 14 maintains a correlation between the session and the relevant user ID to which the communications relate.

One distinguishing feature of the invention is that remote facility 14 acts as a corresponding dedicated virtual client for each of the user IDs received from the refueling environment. From the perspective of Web 38, each time remote facility 14 accesses server 26 in connection with a different user ID, it appears to server 26 that a different client machine is establishing an access connection thereto since a different client identification number (i.e., cookie element) is returned to server 26 from the sender (i.e., remote facility 14).

Clearly, it is possible with the present invention for a single client-side entity such as remote facility 14 to effectively function (in a virtual manner) as a plurality of host clients each independently recognizable by server 26 as a distinct entity. As a result, similar to conventional server configurations, server 26 can maintain independent user profile records in relation to respective unique identification numbers (each corresponding to a respective user ID), even though all of the client-server communications involve a single client-side entity, namely, remote facility 14.

In one form, remote facility 14 can be considered a proxy client that effectively performs all of the various client-side activities that client location 40 would otherwise perform if communicating directly with server 26 in a standard client-server relationship. In this capacity, remote facility 14 may execute its communication tasks with respect to server 26 under the direction of commands and instructions issued from client location 40. Alternately, remote facility 14 may be programmed to execute a known sequence of communication tasks, and only awaits receipt of a user ID from the refueling environment to initiate or launch the sequence.

Returning now to FIG. 4, and assuming that a cookie relating to the current user ID 42 has been set, namely, that database 15 includes a cookie element corresponding to the user ID of interest (and which was assigned by server 26), the protocol of FIG. 4 resumes in the following manner.

In response to the cookie request 44 from server 26, remote facility 14 searches and retrieves from database 15 the applicable cookie element that corresponds to the current user ID of interest (step 62). It is seen that the user ID is employed as the indexing mechanism in database 15 to identify the relevant database record 17.

Of course, since each user ID likely will be associated with multiple cookie elements each relating to a different server, remote facility 14 will have a conventional functionality that enables it to identify and retrieve the particular cookie element that was assigned and set by the specific server 26 of interest. In a known manner, multiple cookie elements would be set when internet communications associated with a particular user ID include visits to various servers. In particular, each accessed server would cause a separate distinct identification number (i.e., cookie element) to be assigned and set, during an initial visit.

For purposes of identifying the correct cookie element, remote facility 14 is provided with a functionality that enables it to identify and retrieve from database 15 only that cookie element for a particular user ID that provides a match in connection with the current server specified for access. For example, an evaluation of the domain attributes for each cookie element associated with a particular user ID will identify the correct cookie element matching the current server.

More specifically, as well known to those skilled in the art, a match occurs when the specification for the targeted network resource falls within the range defined by the domain attributes of the cookie under examination. A simple comparison operation can carry out this evaluation.

A match therefore may occur involving the server that made the original assignment of the unique identification number or some other server covered by the domain attributes definition. Typically, though, for applications similar to those contemplated herein involving the development of customized content, a domain attribute match will be limited to the particular server that generated and set the cookie element.

Following a search of database 15 that yields a successful cookie match, the remote facility 14 then sends a communication 45 to server 26 including the retrieved cookie element 19 (step 64). The transmitted cookie element includes the unique identification number that was originally assigned by server 26 during an initial visit involving the respective user ID 42, and then transmitted to remote facility 14 where it was associated with user ID 42 and stored in database 15 as cookie element 19.

Web server 26 receives the cookie sent from remote facility 14 and compares the state information stored therein (i.e., the identification number assigned by server 26) to the various cookie data elements stored within database 29 to see if a match exists (steps 66, 68). In particular, the server conducts a match or comparison operation to determine if the received identification number corresponds to an existing user of the server, namely, whether the identification number refers to a prior visitor to the Web site. The assigned identification number (i.e., the state information embodied within the cookie element) is used as an index key to search database 29, namely, the field 23 of each database record 21 where the server-assigned user identification number is located.

Once the appropriate database record 21 in cookie database 29 has been identified by its corresponding identification number, the corresponding user profile data 25 is retrieved (step 68). Server 26 is provided with a custom page generator 27 generally representative of any conventional means by which a Web page can be generated, constructed, or otherwise furnished. In a preferred form, page generator 27 enables the Web page construction process to be selectively customized or tailored according to input data, such as by incorporating the information represented by user profile data 25 retrieved from database 29 (step 70). The customized Web page 46 generated at server 26 is then sent to remote facility 14 (step 72).

At the remote facility 14, the customized Web page 46 received from server 26 is downloaded to dispenser position 20 associated with the user ID 42 relating to the current communications session with server 26 (steps 74, 76). The manner of routing the customized Web page 46 to the user destination within the refueling environment may occur in various alternate ways. In one form, the Web page is first downloaded from remote facility 14 to controller 36 of the particular fuel dispenser site where the user destination is located. Next, controller 36 forwards the Web page to the applicable dispenser position 20. It should be apparent that conventional routing techniques may be used.

In another form, the Web page may be downloaded from remote facility 14 directly to the user location (i.e., client location 40) in the event that client machine 39 is provided with a network connection to Web 38. In this manner, no routing need take place through controller 36. Optionally, the Web page may be downloaded from server 26 to a selective one of the fuel dispenser sites (i.e., controller 36) and/or the client location 40, thereby bypassing remote facility 14. This routing scenario is readily available in a fully networked configuration such as shown in FIG. 2.

At the fuel dispenser site, the customized Web page received from remote facility 14 is routed by controller 36 to the designated client location 40 (at dispenser position 20) having the refueling customer from which the relevant user ID 42 originated (step 78). The Web page is then processed by browser 37 in a conventional manner for presentation to the customer who is manning client location 40 (step 80).

At this point, the customer at client location 40 can continue the open communications session with server 26 in a conventional manner. For example, as part of the ongoing visit to server 26, the user can make various available selections from the displayed Web page, submit the selections for processing by server 26, and upload further requests for information to server 26 via remote facility 14 (step 82). Remote facility 14 will continue to function in a client-type manner vis-á-vis server 26 to manage and otherwise facilitate communications between dispenser position 20 and server 26 (step 84).

At the server-side, server 26 continues to receive and process newly submitted requests for information received from remote facility 14 (step 86) pertaining to client location 40. Among its various tasks, server 26 will download requested Web pages (according to user selections embodied in the content request) and update the relevant user profile data accordingly.

All of these communication activities involving client location 40 and server 26 are preferably accomplished during a single open communications session. In particular, remote facility 14 will preferably not close the session with server 26 until an indication of such a decision is received from client location 40, namely, browser 37.

Additionally, the manner of generating, executing, performing, carrying out, and otherwise providing the various communications between remote facility 14 and Web server 26 according to the protocol outlined in FIG. 4 may be performed using technologies well known to those skilled in the art. For example, any conventional software and programming techniques may be used to perform the various internet-related operations and functions involving the cookie utility, request commands, and response/reply commands. The communications between remote facility 14 and Web server 26 preferably follow a conventional client-server interaction typical of the Internet.

Further information on the cookie mechanism may be found in the document entitled "Persistent Client State HTTP Cookies", a preliminary specification, found on the Internet at http://home.netscape.com/newsref/std/cookie_spec.html, and the document entitled "Proposal for Extended Persistent Client State HTTP Cookies", found on the Internet at http://www.sbm.temple.edu/~magnus/ext_cookie_spec.html, both incorporated herein by reference thereto.

Various advantages are apparent from the embodiment of FIGS. 3 and 4. As described, the remote facility centrally maintains a compilation of refueling customer identification elements each associated with at least one respective state object (cookie element) each uniquely generated by a respective server. In this manner, it becomes possible for the remote facility to effectively serve as a proxy-type client entity capable of executing all of the client-side operations that each internet-enabled dispenser position would otherwise normally perform if it were communicating directly with the server in a typical client-server relationship.

From the viewpoint of the accessed server, though, it does appear as if each Web site visit is occurring in connection with a distinct client-side entity, since the same distinguishing identification number (i.e., cookie element) is being used to identify the client-side requester to the server in response to the server-side cookie request. Thus, during each subsequent visit to a server conducted by the remote facility in connection with a corresponding refueling customer user ID, the transmittal of the same corresponding cookie element as before causes the server to effectively recognize the client-side requester as a distinct corresponding user making a return visit. The server then treats the remote facility communications as part of a return visit by the distinct user, enabling the same corresponding user profile record to be updated, since these profile records are identified by a respective unique identification number.

Figure 5:
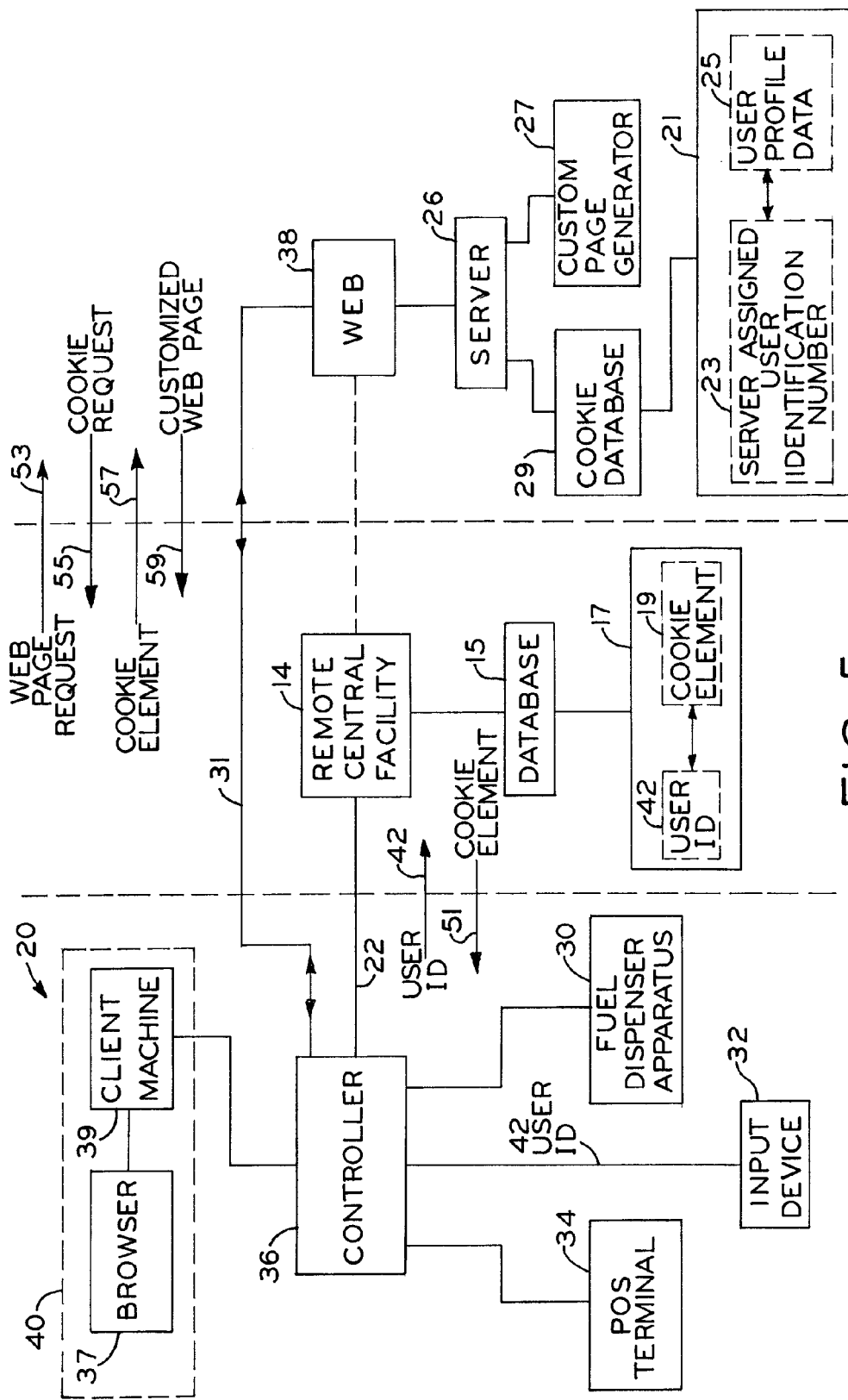
FIG. 5 is a block diagram illustration of a communications system, according to another embodiment of the present invention.

Referring now to FIG. 5, there is shown a communications system similar to that shown in FIG. 3 for implementing a communications and data exchange protocol, according to another embodiment of the present invention. The protocol and/or transaction sequence is set forth in the flow diagram of FIG. 6.

During operation, with specific reference to FIG. 6 in conjunction with FIG. 5, a customer interested in requesting a refueling transaction at dispenser position 20 submits credit card account information via input device 32 (step 100). Input device 32 transmits the retrieved credit card account information to controller 36 in the form of a user identification (ID) signal 42. The user ID 42 is then transmitted from the refueling environment and received at remote facility 14 (steps 102, 104). The protocol steps 100, 102, 104 correspond to steps 50, 52, 54 in FIG. 4.

In response to receiving the user ID, the remote facility 14 executes a search of database 15 to identify and retrieve the cookie element 19 corresponding to user ID 42 (step 106). As in FIGS. 3 and 4, the cookie element associated with the user ID incorporates and/or represents the unique identification number assigned by illustrative server 26 during an initial access connection (i.e., Web site visit) involving user ID 42.

It is envisioned that the operational procedure associated with formulating a unique cookie element (i.e., server-assigned identification number) for each user ID will take place in the following manner. As discussed further, the protocol of FIG. 6 involves a communications session between client location 40 and server 26 that is initiated and maintained by client location 40. More specifically, unlike the protocol of FIG. 4, remote facility 14 simply communicates to client location 40 the relevant cookie element associated with the current user ID of interest, while the entirety of the client-server session takes place between client location 40 and server 26 without the assistance of remote facility 14.

However, in the event that database 15 does not contain any cookie element corresponding to user ID 42 (specifically, there is no cookie match involving the specified server 26), remote facility 14 may respond in various ways. In one sequence, in a manner similar to that discussed in connection with FIGS. 3 and 4, remote facility 14 can initiate an information request with server 26. Then, in response to a cookie request from server 26, remote facility 14 can direct a reply communication to server 26 indicating that no cookie was found. As before, server 26 will assign a unique identification number and send a corresponding cookie to remote facility 14 along with a set cookie instruction. Remote facility 14 will then associate the cookie received from server 26 with the relevant user ID.

In another alternate sequence, following receipt of user ID 42 and an unsuccessful search of database 15, remote facility 14 can simply communicate to client location 40 that no cookie was found. The client location 40 can then carry out a similar interchange with server 26 to yield the assignment of a unique identification number by server 26. For example, the cookie element generated by server 26 which embodies the assigned identification number would first be sent to client location 40 and then forwarded from there to remote facility 14, where it would be associated with the pertinent user ID and stored in database 15.

Returning again to FIG. 6, and assuming that a cookie relating to the current user ID 42 has been set, namely, that database 15 includes a cookie element corresponding to the user. ID 42 of interest (and which was assigned by server 26), the protocol of FIG. 6 resumes in the following manner.

Following retrieval of the relevant cookie element 19 associated with user ID 42 and relating to server 26, remote facility 14 sends a communication 51 to client location 40 including the retrieved cookie element(step 108). In one form, the communication is routed by dispenser site controller 36 to the relevant dispenser position 20 containing client location 40. As before, the transmitted cookie element includes the unique identification number that was originally assigned by server 26 during an initial visit involving user ID 42, and then furnished to remote facility 14 where it was associated with user ID 42 and stored in database 15, namely, record 17 pertaining to user ID 42.

In response to receiving the cookie element communication 51 from remote facility 14, client location 40 initiates a communications session with a selective server 26 within the World Wide Web 38 by issuing a request for information (steps 110, 112), according to a conventional protocol and format. The Web server 26 receives the Web page request 53 communicated from client location 40 (step 114). In response to the information request, server 26 sends a reply communication to client location 40 that includes a request for state information (step 116). In a preferred form, this state information request 55 takes the form of an interrogatory that prompts or requests client location 40 for a cookie data element.

The client location 40 receives the cookie request from server 26 (step 118). In response, client location 40 directs a communication 57 to server 26 that includes the cookie element 19 relating to user ID 42 that was previously furnished to client location 40 by remote facility 14 (step 120).

The Web server 26 receives the cookie communication 57 sent from client location 40 and compares the state information stored therein (i.e., identification number) to the cookie data elements stored within database 29 to see if a match exists (steps 122, 124). Protocol steps 122, 124 are similar to steps 66, 68 in FIG. 4.

Once the appropriate database record 21 has been identified by the identification number, the corresponding user profile data 25 is retrieved (step 124). Server 26 uses page generator 27 to construct a customized Web page utilizing the information represented by user profile data 25 retrieved from database 29 (step 126). Protocol step 126 is similar to step 70 in FIG. 4.

The customized Web page 59 generated at server 26 is then downloaded to client location 40 (step 128). In particular, at the relevant fuel dispenser site, the customized Web page received from server 26 is routed by controller 36 to the designated client location 40 having the refueling customer from which the relevant user ID 42 originated (step 130). The Web page is then processed by browser 37 in a conventional manner for presentation to the customer who is manning client location 40 (step 132).

At this point, the customer at client location 40 can continue the open communications session with server 26 in a conventional manner. For example, as part of the ongoing visit to server 26, the user can make various available selections from the displayed Web page, submit the selections for processing by server 26, and upload further requests for information to server 26 (step 134).

At the server-side, server 26 continues to receive and process newly submitted requests for information received from client location 40 (step 136) pertaining to client location 40. Among its various tasks, server 26 will download requested Web pages (according to user selections embodied in the content request) and update the relevant user profile data accordingly.

All of these communication activities involving client location 40 and server 26 are preferably accomplished during a single open communications session. One feature of the protocol outline in FIG. 6 is that the online activity defining the visit between client location 40 and server 26 does not involve remote facility 14. For this purpose, various suitable means may be used to facilitate an access connection between client location 40 and server 26.

For example, the fuel dispenser site can be provided with a network connection coupled to controller 36 that allows client location 40 to communicate with Web 38 over communications link 31. In one form, this link 31 may provide an Internet connection, such as in the fully networked configuration of FIG. 2. Alternately, client machine 40 may itself be provided with a separate network connection to communications link 31 that enables it to avoid routing through controller 36. In this case, client machine 40 could be connected directly to the Internet. It should be apparent, however, that any suitable communications setup can be implemented to facilitate the indicated communication requirements.

Various advantages are apparent from the embodiment of FIGS. 5 and 6. As described, the remote facility centrally maintains a compilation of refueling customer identification elements each associated with at least one respective state object (cookie element) that was uniquely assigned by a respective server to fully identify a client entity. In this manner, it becomes possible for the user (i.e., refueling customer) to selectively designate any machine as a client location capable of being effectively recognized by the network server as the same distinct user as in previous visits.

This recognition is possible since the server-specific state object (cookie element) associated with the user ID of the relevant customer is simply forwarded by the remote facility to the designated client location and used by the customer (i.e., browser 37) in communications with the specified Web server. In particular, this cookie element received by client location 40 from remote facility 14 is furnished to the server in response to a cookie request. The Web server itself has no indication that the user is operating from a machine different from prior visits since the user has been correctly identified using the same state object, i.e., cookie data element.

In effect, the relevant state object (i.e., cookie) travels with the customer since the cookie is immediately obtainable by the customer from the remote facility regardless of the location (i.e., fuel dispenser position) that the customer has chosen as the current client site. Because the same traveling cookie is communicated from all possible user client locations to the Web server in response to the cookie request, it effectively appears to the Web server that all client-side communications are occurring in connection with the same user and client entity.

Accordingly, although the user may be conducting a web site visit from a dispenser location and client machine different from previous visits, the server nevertheless recognizes and understands that the same user is visiting since the same cookie data element (i.e., server-assigned identification number) is associated with the visit. Thus, the same user profile record may be continuously updated as the refueling customer visits the server from different locations, since the same identification value (i.e., cookie element) that uniquely identifies each user profile record directs the server into behaving as if the same client-side entity is accessing the server. In effect, each actual client location is reconfigured by the traveling cookie into a unique virtual client entity corresponding to a respective customer and uniquely recognizable by the server.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for use with a network comprising at least one resource, said system comprising:
   a refueling environment capable of servicing at least one user;
   a remote facility disposed apart from the refueling environment;
   said remote facility being configured to execute operational functions comprising:
      receiving a user identification from the refueling environment,
      providing state information associated with the user identification, and
      sending, based on a state information prompt received from a selective one of the at least one resource in said network, the state information associated with the user identification from the remote facility to the selective one of the at least one resource in said network.

2. The system as recited in claim 1, wherein the selective one network resource being configured to execute operational functions comprising:
   directing customized resource content from the selective one network resource to the refueling environment, the customized resource content being developed by the selective one network resource using the state information received from the remote facility.

3. The system as recited in claim 2, wherein the selective one network resource further comprises:
a means for developing the customized resource content, said content development means being configured to operatively perform the following operations:
retrieving user profile data corresponding to the user identification, the retrieval operation using the state information received from the remote facility to identify the user profile data, the user profile data being maintained by the selective one network resource, and
generating content using the retrieved user profile data.

4. The system as recited in claim 2, wherein the delivery of customized resource content from the selective one network resource to the refueling environment occurs via the remote facility.

5. The system as recited in claim 1, wherein at least one network resource respectively further comprises:
a data structure comprising a plurality of user data records each indexed with a respective state information element;
a means for retrieving a user data record from the data structure, using state information operatively received from the remote facility as an identifier;
a means for generating content, using the retrieved user data record; and
a means for communicating the generated content from the respective network resource to the refueling environment.

6. The system as recited in claim 1, wherein said remote facility being configured further to execute operational functions comprising:
sending a resource request from the remote facility to the selective one network resource.

7. The system as recited in claim 6, wherein at least one network resource being respectively configured to execute operational functions comprising:
transmitting the prompt from the selective network resource to the remote facility in response to the resource request from the remote facility to the selective network resource; and
generating and sending state information to the remote facility, in response to an indication received from the remote facility responsive to the state information prompt that no state information exists relative to the respective user identification associated therewith.

8. The system as recited in claim 1, wherein the state information includes a cookie.

9. The system as recited in claim 1, wherein the user identification comprises at least one of credit card information, biometric data, bar code data, phone number data, and name data.

10. A system for use with a network comprising at least one resource, said system comprising:
a refueling environment capable of servicing at least one user;
a remote facility disposed apart from the refueling environment;
said remote facility being configured to execute operational functions comprising:
receiving at least one user identification from the refueling environment,
sending at least one respective request for information from said remote facility to said network, each information request being associated with a respective user identification and being directed to a respective selective network resource, and
sending at least one state object communication from said remote facility to said network, each state object communication being associated with a respective user identification and being directed to the respective selective network resource associated therewith, each state object communication being responsive to a respective state information request issued by the respective selective network resource associated therewith, each state object communication including respective state information associated with the respective user identification associated therewith.

11. The system as recited in claim 10, wherein each respective selective network resource being configured to execute operational functions comprising:
generating content according to a user profile maintained by the respective selective network resource, the user profile being identified by the respective state information communicated from the remote facility, and
directing the generated content from the respective selective network resource to said refueling environment.

12. The system as recited in claim 10, wherein:
at least one network resource being configured to operatively execute the following operations:
generating state information, responsive to an indication received from said remote facility that no state information is present relative to a respective user identification, and
sending the generated state information to said remote facility; and
said remote facility being configured to execute operational functions comprising:
associating the state information received from the respective network resource with the respective user identification.

13. The system as recited in claim 10, wherein the state information includes a cookie.

14. The system as recited in claim 10, wherein the user identification comprises at least one of credit card information, biometric data, bar code data, phone number data, and name data.

15. A system for use with a network comprising at least one node, said system comprising:
a refueling environment comprising a plurality of fuel dispenser sites, said refueling environment being capable of servicing at least one user;
a central facility disposed apart from at least one fuel dispenser site;
said refueling environment being configured to selectively operatively communicate at least one user identification from said refueling environment to said central facility, each communicated user identification being associated with a respective user of a respective fuel dispenser site;
said central facility comprising:
a means for providing at least one respective state object in association with each respective user identification, and
a means, responsive to at least one respective user identification, for directing a respective communication from said central facility to a respective node in said network, based on a state object prompt received from the respective node in said network, the respective communication including at least one respective state object associated with the respective user identification.

16. The system as recited in claim 15, wherein at least one respective network node further comprises:
- a means for generating customized content, the content being developed using a respective state object communication received by the respective one network node from said central facility; and
- a means for directing the generated content to a respective fuel dispenser site corresponding to the respective user having the respective user identification associated with the respective state object communication.

17. The system as recited in claim 16, wherein the respective generation means of each respective one network node further comprises:
- a means for retrieving respective user profile data corresponding to the respective user identification associated with the respective state object communication received by the respective one network node from said central facility, the retrieval operation using the respective state object communication received from said central facility to identify the respective user profile data, the user profile data being accessible to the respective one network node, and
- a means for providing content using the retrieved user profile data.

18. The system as recited in claim 15, wherein said central facility further comprises:
- a means for generating and sending at least one request for information from said central facility to said network, each information request being associated with a respective user identification and being directed to a respective network node; and
- a means for generating and sending at least one reply communication from said central facility to said network, each reply communication being responsive to a respective state object request sent thereto by a respective network node and being directed to the respective network node, each respective reply communication including at least one state object associated with the respective user identification.

19. The system as recited in claim 18, wherein:
at least one network node respectively further comprises:
- a means for generating a respective state object, the respective state object being associated with a respective communication from said central facility involving a respective user identification, and
- a means for sending the generated state object to said central facility;

said central facility further comprises:
- a means for associating respective state information received from a respective network node with the respective user identification associated therewith.

20. The system as recited in claim 15, wherein:
said central facility further comprises:
- a means for directing at least one respective communication from said central facility to a respective fuel dispenser site, each respective communication being associated with a respective user identification of a corresponding user of the respective fuel dispenser site, at least one central facility communication including at least one state object associated with the respective user identification; and said refueling environment further comprises:
- a means for directing at least one respective communication from a respective corresponding fuel dispenser site to a respective node in said network, at least one fuel dispenser site communication including at least one state object communicated thereto from said central facility.

21. The system as recited in claim 15, wherein at least one state object includes at least one respective cookie.

22. The system as recited in claim 15, wherein each user identification respectively comprises at least one of credit card information, biometric data, bar code data, phone number data, and name data.

23. The system as recited in claim 15, wherein at least one network node respectively further comprises:
- a data structure comprising a plurality of user data records each correspondingly associated with a respective state information element;
- a means, responsive to a respective state object received by the respective one network node from said central facility, for retrieving from said data structure a user data record corresponding to the respective state object;
- a means for generating content, using the retrieved user data record; and
- a means for directing the generated content to at least one of said central facility and said refueling environment.

24. A system for use with a network comprising at least one resource, said system comprising:
- a refueling environment capable of servicing at least one user;
- a remote facility disposed apart from said refueling environment;
- said remote facility being configured to execute operational functions comprising:
  - receiving a user identification from said refueling environment,
  - providing state information associated with the user identification, and
  - sending the state information associated with the user identification from said remote facility to said refueling environment; and
- said refueling environment being configured to execute operational functions comprising:
  - sending, in response to a state information prompt received from a selective one of the at least one resource in said network, the state information received from said remote facility to the selective one of the at least one resource in said network.

25. The system as recited in claim 24, wherein at least one respective network resource further comprises:
- a means for providing customized resource content to said refueling environment, the customized resource content being developed by the respective one network resource using state information received from said refueling environment.

26. The system as recited in claim 24, wherein at least one network resource respectively further comprises:
- a data structure comprising a plurality of user data records each indexed with a respective state information element;
- a means, responsive to state information received from said refueling environment, for retrieving a user data record from said data structure corresponding to the received state information;
- a means for generating content, using the retrieved user data record; and
- a means for directing the generated content to said refueling environment.

27. The system as recited in claim 24, wherein the state information includes a cookie.

28. The system as recited in claim 24, wherein the user identification comprises at least one of credit card information, biometric data, bar code data, phone number data, and name data.

29. A system for use with a network comprising at least one node, said system comprising:
- a refueling environment comprising at least one fuel dispenser site, said refueling environment being capable of servicing at least one user;
- a remote facility disposed apart from at least one fuel dispenser site;
- said refueling environment being configured to execute operational functions comprising:
  - directing at least one user identification from said refueling environment to said remote facility, each user identification being associated with a respective user of a respective fuel dispenser site; and
  - sending, in response to a state information request from a selective node of the at least one node in the network, respective state information associated with the at least one user identification to the selective node on the network, the respective state information received at the refueling environment from the remote facility; and
- said remote facility comprises:
  - a means for providing respective state information in association with at least one respective user identification received from said refueling environment, and
  - a means, responsive to a respective user identification received from said refueling environment, for sending a respective communication to the respective fuel dispenser site associated with the respective user identification, the respective communication including respective state information associated with the respective user identification.

30. The system as recited in claim 29, wherein at least one fuel dispenser site respectively further comprises:
- a means, responsive to a respective state information communication received from said remote facility, for sending a respective user communication to a selective one of said at least one network node, the respective user communication including the respective state information.

31. The system as recited in claim 30, wherein at least one network node respectively further comprises:
- a means, responsive to respective state information operatively received from a respective fuel dispenser site, for generating content according to a user profile maintained by the respective one network node, the user profile being identified by the received respective state information; and
- a means for directing the generated content to the respective fuel dispenser site.

32. The system as recited in claim 29, wherein the state information includes a cookie.

33. The system as recited in claim 29, wherein at least one user identification respectively comprises at least one of credit card information, biometric data, bar code data, phone number data, and name data.

34. A system for use with a network comprising at least one node, said system comprising:
- a refueling environment comprising at least one fuel dispenser site, said refueling environment being capable of servicing at least one user;
- a central facility disposed apart from at least one fuel dispenser site;
- said refueling environment comprising:
  - a means for communicating at least one user identification from said refueling environment to said central facility, each communicated user identification being associated with a respective user of a respective fuel dispenser site; and
  - a means for sending, in response to a state information request from a selective node of the at least one node in the network, respective state information associated with the at least one user identification to the selective node on the network, the respective state information received at a respective fuel dispenser site from the central facility; and
- said central facility comprising:
  - a means for associating at least one respective user identification received from said refueling environment with at least one respective state object, and
  - a means, responsive to receiving a respective user identification communicated from a respective fuel dispenser site associated therewith, for directing a communication from said central facility to the respective fuel dispenser site, the communication including at least one state object associated with the respective user identification.

35. The system as recited in claim 34, wherein at least one respective fuel dispenser site respectively further comprises:
- a means, responsive to receiving a respective state object communication from said central facility, for generating and sending a respective communication to a respective node in said network, the respective dispenser site communication including at least one state object received from said central facility.

36. The system as recited in claim 35, wherein at least one network node respectively further comprises:
- a means, responsive to receiving a respective state object communication from a respective fuel dispenser site, for generating respective customized content, the content being developed using the respective state object communication received by the respective one network node; and
- a means for communicating the generated content to the respective fuel dispenser site.

37. The system as recited in claim 35, wherein at least one network node respectively further comprises:
- a data means for providing a plurality of user profile data elements each associated with a respective state element;
- a means, responsive to receiving a respective state object communication from a respective fuel dispenser site, for retrieving from said data means the respective user profile data element corresponding to the respective state object contained within the respective state object communication;
- a means for generating content using the retrieved user profile data element; and
- a means for communicating the generated content to the respective fuel dispenser site.

38. The system as recited in claim 34, wherein at least one state object includes at least one respective cookie.

39. The system as recited in claim 34, wherein at least one user identification respectively comprises at least one of credit card information, biometric data, bar code data, phone number data, and name data.

* * * * *